United States Patent
Bennett et al.

(10) Patent No.: US 12,357,944 B2
(45) Date of Patent: Jul. 15, 2025

(54) PROCESS FOR SEPARATING A CARBON DIOXIDE PRODUCT STREAM FROM A FLUE GAS STREAM

(71) Applicant: UOP LLC, Des Plaines, IL (US)

(72) Inventors: Erick J. Bennett, New Lenox, IL (US); Shubhra J Bhadra, Gurugram (IN); Sakthivelan Maadasamy Durai, Gurugram (IN); Jan de Ren, Arlington Heights, IL (US); Raul Zavala, Mount Prospect, IL (US)

(73) Assignee: UOP LLC, Rosemont, IL (US)

( * ) Notice: Subject to any disclaimer, the term of this patent is extended or adjusted under 35 U.S.C. 154(b) by 0 days.

(21) Appl. No.: 18/811,755

(22) Filed: Aug. 21, 2024

(65) Prior Publication Data

US 2025/0073639 A1 Mar. 6, 2025

Related U.S. Application Data

(60) Provisional application No. 63/580,637, filed on Sep. 5, 2023.

(51) Int. Cl.
*B01D 53/75* (2006.01)
*B01D 53/047* (2006.01)
(Continued)

(52) U.S. Cl.
CPC .......... *B01D 53/75* (2013.01); *B01D 53/047* (2013.01); *B01D 53/343* (2013.01); *B01D 53/50* (2013.01); *B01D 2257/302* (2013.01); *B01D 2257/504* (2013.01); *B01D 2257/80* (2013.01); *B01D 2258/0283* (2013.01); *B01D 2259/416* (2013.01)

(58) Field of Classification Search
CPC .... B01D 53/75; B01D 53/047; B01D 53/343; B01D 53/50; B01D 2257/302; B01D 2257/504; B01D 2257/80; B01D 2258/0283; B01D 2259/416
See application file for complete search history.

(56) References Cited

U.S. PATENT DOCUMENTS 2,961,301 A * 11/1960 Steinhoff ................ C01B 19/02
23/308 R
4,542,114 A * 9/1985 Hegarty ............... F25J 3/04527
502/52
(Continued)

FOREIGN PATENT DOCUMENTS

EP 0162251 A1 11/1985

*Primary Examiner* — Jennifer Dieterle
*Assistant Examiner* — Phillip Y Shao
(74) *Attorney, Agent, or Firm* — Paschall & Associates, LLC; James C. Paschall

(57) ABSTRACT

A process for separating a carbon dioxide product stream from a flue gas stream is disclosed. The process comprises passing a stream of carbon dioxide and oxygen to a regenerator to generate a catalyst stream and produce a flue gas stream comprising carbon oxides, and/or nitrogen oxides, catalyst fines, oxygen, and water. Heat is transferred to a water stream from the flue gas stream in a heat recovery unit to form a cooled flue gas stream and a steam stream. Water is removed from the cooled flue gas stream in a dehydration unit to provide a dehydrated flue gas stream. The dehydrated flue gas stream is separated into an oxygen stream and a carbon dioxide product stream.

18 Claims, 4 Drawing Sheets

(51) Int. Cl.
  *B01D 53/34*  (2006.01)
  *B01D 53/50*  (2006.01)

(56) References Cited

U.S. PATENT DOCUMENTS

| | | | |
|---|---|---|---|
| 6,506,351 B1 * | 1/2003 | Jain | B01D 53/06 |
| | | | 423/239.1 |
| 11,541,348 B2 | 1/2023 | Rodrigues et al. | |
| 2020/0061537 A1 * | 2/2020 | Seng | F23J 15/02 |
| 2022/0306463 A1 | 9/2022 | Cruz et al. | |
| 2022/0306464 A1 | 9/2022 | Cruz et al. | |
| 2022/0306468 A1 | 9/2022 | Cady et al. | |

\* cited by examiner

PROCESS FOR SEPARATING A CARBON DIOXIDE PRODUCT STREAM FROM A FLUE GAS STREAM

FIELD

The field is related to a process and apparatus for regenerating catalyst from a fluidized catalytic process. Particularly, the field relates to a process for regenerating catalyst from a fluidized catalytic process with a carbon dioxide recycle stream.

BACKGROUND

Catalytic cracking can create a variety of products from larger hydrocarbons. Often, a feed of a heavier hydrocarbon, such as a vacuum gas oil, is provided to a catalytic cracking reactor, such as a fluid catalytic cracking reactor. Various products may be produced from such a system, including a gasoline product and/or light product such as propene and/or ethene.

Fluid catalytic cracking (FCC) is a hydrocarbon conversion process accomplished by contacting hydrocarbons in a fluidized reaction zone with a catalyst composed of finely divided particulate material. The reaction in catalytic cracking, as opposed to hydrocracking, is carried out in the absence of substantial added hydrogen or the consumption of hydrogen. As the cracking reaction proceeds substantial amounts of highly carbonaceous material referred to as coke is deposited on the catalyst. A high temperature regeneration operation within a regeneration zone combusts coke from the catalyst. Coke-containing catalyst, referred to herein as coked catalyst, is continually removed from the reaction zone and replaced by essentially coke-free catalyst from the regeneration zone. Fluidization of the catalyst particles by various gaseous streams facilitates the transport of catalyst between the reaction zone and regeneration zone. Spent catalyst from the reaction zone can be completely or partially regenerated in the regeneration zone.

A common objective of these configurations is maximizing product yield from the reactor while minimizing operating and equipment costs. Optimization of feedstock conversion ordinarily requires essentially complete removal of coke from the catalyst. This essentially complete removal of coke from catalyst is often referred to as complete regeneration. Complete regeneration produces a catalyst having less than 0.1 and preferably less than 0.05 wt-% coke. In order to obtain complete regeneration, the catalyst has to be in contact with oxygen at elevated temperature for sufficient residence time to permit thorough combustion.

Conventional regenerators typically include a vessel having a coked catalyst inlet, a regenerated catalyst outlet and a combustion gas distributor for supplying air or other oxygen containing gas to the bed of catalyst that resides in the vessel. Cyclone separators remove catalyst entrained in the flue gas before the gas exits the regenerator.

Alternative processes are also used for light olefins production. In one approach, hydrocarbon oxygenates and more specifically methanol or dimethyl ether are used as an alternative feedstock for producing light olefin products. Once the oxygenates are formed, the process includes catalytically converting the oxygenates, such as methanol, into the desired light olefin products in a methanol to olefin (MTO) process. In the MTO process, carbonaceous material, i.e., coke, is deposited on the catalyst as it moved through the reaction zones. The carbonaceous material is removed from the catalyst by oxidative regeneration in one or more regeneration zones wherein catalyst particles withdrawn from the reaction zone is contacted with an oxygen-containing gas stream at sufficient temperature and oxygen concentration to allow the desired amount of the carbonaceous materials to be combusted from the catalyst. In some cases, it is advantageous to only partially regenerate the catalyst, e.g., to remove from about 30 to 80 wt-% of the carbonaceous material.

Flue gas formed by burning the coke in the regenerator is treated for removal of particulates and conversion of carbon monoxide to carbon dioxide perhaps for power and/or heat recovery, after which the flue gas is normally discharged into the atmosphere. Further, incomplete combustion to carbon monoxide can result from poor fluidization or aeration of the coked catalyst in the regenerator or poor distribution of coked catalyst into the regenerator. Generally, the flue gas exiting the regenerator contains carbon monoxide, carbon dioxide, nitrogen and water, along with smaller amounts of other species. Flue gas treatment methods are effective, but the capital and operating costs are high.

Environmental concerns over greenhouse gas emissions have led to an increasing emphasis on separating the greenhouse gases before releasing the flue gases into the atmosphere. Carbon dioxide is the most significant long-lived greenhouse gas in the atmosphere. Carbon dioxide capture from flue gases is still expensive, both from a capital and operational standpoint. For fluidized catalytic processes, air is used for regenerating the spent catalyst. As a result of this operation, the carbon dioxide in the FCC flue gas has a lower concentration in contrast to the concentration of undesired components that interfere with carbon dioxide capture. As a consequence, high capital expenditures are incurred due to a large volume of the flue gas and also large operational utility costs such as high solvent circulating rates and solvent regeneration duties. Apart from this, the flue gas requires extensive treatment prior to carbon capture in order to meet stringent specifications to avoid high solvent degradation rates. High capital expenditures and operational utility costs are necessitated by various and prolonged impurity removal operations.

There is a need for improved processes for removing impurities from flue gas containing carbon dioxide to separate a carbon dioxide product stream meeting applicable specifications. Also, there is a need for a process and an apparatus which reduces capital expenditures and operational utility costs of the carbon dioxide capture section as a part of flue gas treatment, whilst improving energy efficiency and energy recovery.

SUMMARY

The present disclosure provides a process and an apparatus for separating a carbon dioxide product stream from a flue gas stream. The synthesized air combustion process seeks to mitigate the harmful effects of emissions by producing a net combustion product gas comprising carbon dioxide and water vapor by combusting a carbonaceous or hydrocarbon fuel with an oxidizing media comprising oxygen and carbon dioxide. Synthesized air is seen as a way to decarbonize an FCC unit for future sustainability. Utilizing synthesized air combustion in a fluidized catalytic reaction unit changes the flue gas composition, requiring unique carbon dioxide capture processes to facilitate carbon dioxide capture. The present disclosure provides a process for impurity removal in the regenerator flue gas to target a carbon dioxide product specification. This allows separating a carbon dioxide product stream that meets a required carbon dioxide specification from the FCC unit. The advantage of the process includes minimizing equipment and expense while removing impurities from flue gas.

BRIEF DESCRIPTION OF THE DRAWINGS

The various embodiments will hereinafter be described in conjunction with the following FIGURES, wherein like numerals denote like elements.

DEFINITIONS

The term "communication" means that material flow is operatively permitted between enumerated components.

The term "downstream communication" means that at least a portion of material flowing to the subject in downstream communication may operatively flow from the object with which it communicates.

The term "upstream communication" means that at least a portion of the material flowing from the subject in upstream communication may operatively flow to the object with which it communicates.

The term "direct communication" or "directly" means that flow from the upstream component enters the downstream component without passing through a fractionation or conversion unit to undergo a compositional change due to physical fractionation or chemical conversion.

The term "column" means a distillation column or columns for separating one or more components of different volatilities. Unless otherwise indicated, each column includes a condenser on an overhead of the column to condense and reflux a portion of an overhead stream back to the top of the column and a reboiler at a bottom of the column to vaporize and send a portion of a bottoms stream back to the bottom of the column. Feeds to the columns may be preheated. The top pressure is the pressure of the overhead vapor at the vapor outlet of the column. The bottom temperature is the liquid bottom outlet temperature. Overhead lines and bottoms lines refer to the net lines from the column downstream of any reflux or reboil to the column. Stripper columns may omit a reboiler at a bottom of the column and instead provide heating requirements and separation impetus from a fluidized inert media such as steam. Stripper columns typically feed a top tray and take the main product from the bottom.

As used herein, the term "separator" means a vessel which has an inlet and at least an overhead vapor outlet and a bottoms liquid outlet and may also have an aqueous stream outlet from a boot. A flash drum is a type of separator which may be in downstream communication with a separator that may be operated at higher pressure.

As used herein, the term "a component-rich stream" means that the rich stream coming out of a vessel has a greater concentration of the component than the feed to the vessel.

As used herein, the term "rich" means greater than 50%, suitably greater than 75% and preferably greater than 90%.

DETAILED DESCRIPTION

Figure 1:
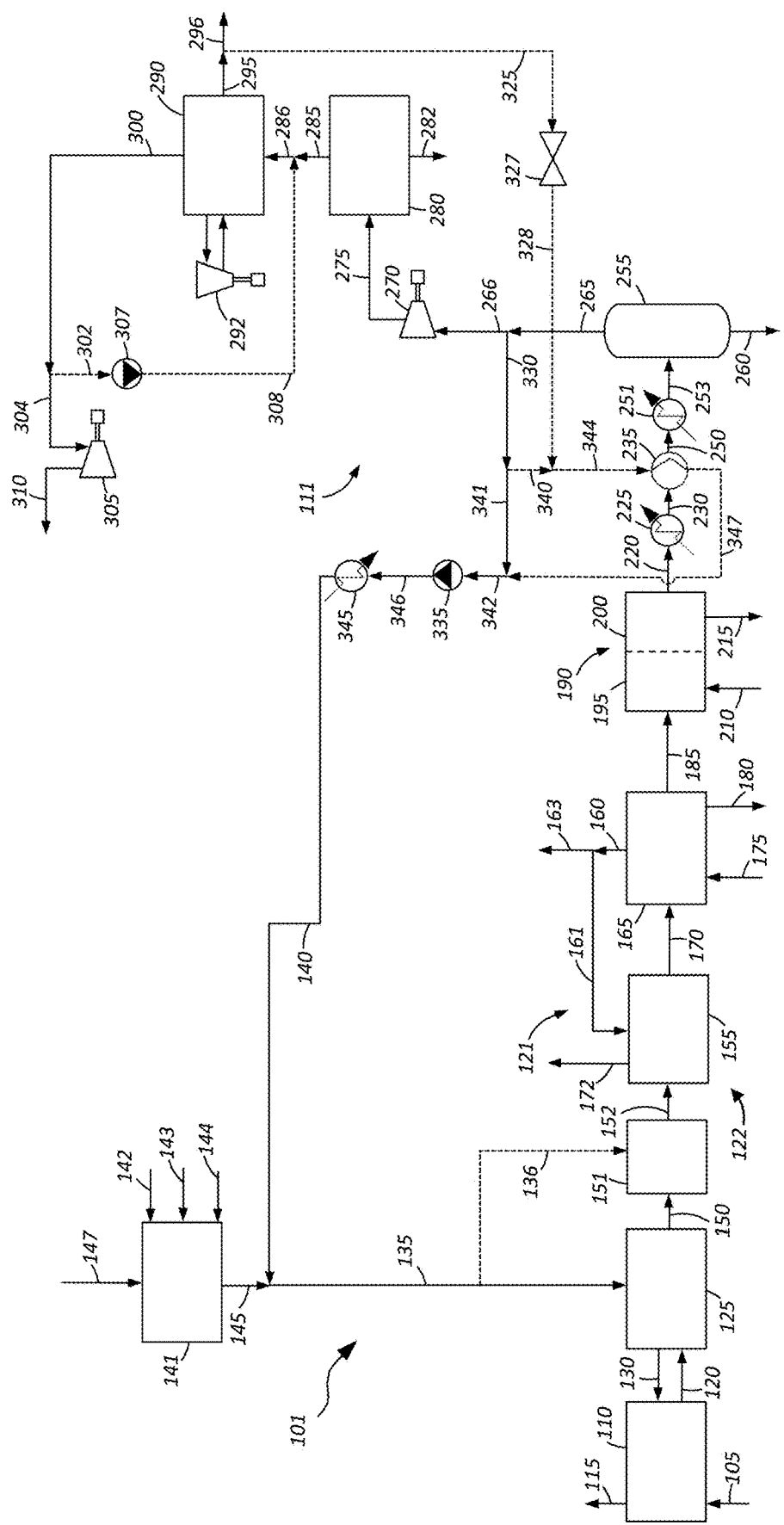
FIG. 1 is a schematic diagram of a process for separating a carbon dioxide product stream from a flue gas stream in accordance with an exemplary embodiment.

In FIG. 1, in accordance with an exemplary embodiment, a process 101 is shown for separating a carbon dioxide product stream from a flue gas stream. The process 101 comprises a regenerator 125, a heat recovery section 121, a decontamination unit 190, and a carbon dioxide separation section 111. A feed stream in line 105 is sent to a fluidized catalyst reactor 110 such as an FCC unit. The catalytic product is separated from the catalyst and the product containing stream in line 115 is sent for further processing. A spent catalyst stream in line 120 is sent to a regenerator 125 where coke on the catalyst is burned to regenerate the catalyst. A regenerated catalyst stream in line 130 is withdrawn from the regenerator 125 and returned to the fluidized catalytic reactor 110. A gaseous stream is also passed to the regenerator 125. In an aspect of the present disclosure, the regenerator 125 may be an FCC regenerator.

In accordance with the present disclosure, a stream of carbon dioxide and oxygen in line 135 is also passed to the regenerator 125 to regenerate the catalyst stream taken in line 130 and produce a flue gas stream comprising carbon oxides, nitrogen oxides, catalyst fines, oxygen, and water in line 150.

In a fluidized catalytic process, catalyst particles are repeatedly circulated between a reaction zone and a catalyst regenerator unit. During regeneration, coke deposited on the catalyst particles during reactions in the reaction zone is removed at elevated temperatures by oxidation in the regenerator 125. The removal of coke deposits restores the activity of the catalyst particles to the point where they can be reused in the reaction zone. The present disclosure is directed towards handling the flue gas stream from the regenerator including an FCC regenerator. The regenerated catalyst is withdrawn in line 130 from the regenerator 125 and handled as known in the art.

In an aspect, the flue gas stream in line 150 is a carbon dioxide rich flue gas stream. The flue gas stream in line 150 is at a high temperature and heat can be recovered from the flue gas stream in line 150 prior to further treatment. The flue gas stream in line 150 may be passed to the heat recovery unit 121 for transferring heat from the flue gas stream in line 150 to form a cooled flue gas stream and a steam stream. In an exemplary embodiment, the heat recovery section 121 is a heat recovery steam generator (HRSG) 122. The HRSG 122 comprises a superheated steam section 155 and a saturated steam section 165. The flue gas stream in line 150 is passed to the superheated steam section 155 of the HRSG 122 to transfer heat to a primary steam stream in line 161 and produce a superheated steam stream in line 172 and a heat exchanged flue gas stream in line 170. The heat exchanged flue gas stream in line 170 is sent to the saturated steam section 165 of the HRSG 122. In the saturated steam section 165, a boiler feed water stream 175 is heated by the heat exchanged flue gas stream in line 170 producing a saturated steam stream in line 160 and a partially cooled flue gas stream in line 185. A condensate stream in line 180 is withdrawn from the saturated steam section 165. The primary steam stream in line 161 taken from the saturated steam stream in line 160 is sent to the superheated steam section 155 to be superheated. The remainder steam stream in line 163 taken from the saturated steam stream in line 160 can be withdrawn and sent to other parts of the plant for use as needed. The partially cooled flue gas stream in line 185 is withdrawn from the saturated steam section 165 and may be passed to the decontamination section 190.

In accordance with an exemplary embodiment, the regenerator 125 may be full burn or a full combustion regenerator. For a full burn regenerator, the heat recovery section 121 includes only a HRSG unit 122. A full burn regenerator does not require a CO combustor 151 for burning carbon monoxide (CO) to carbon dioxide. So, in a full burn regenerator 125, a flue gas stream in line 150 is sent to the HRSG unit 122. A full or partial combustion regenerator may operate at a temperature ranging from about 670° C. to about 740° C. or from about 650° C. to about 700° C. In the HRSG 122, the hot flue gas is indirectly heat exchanged with water to produce steam and condensate stream which are withdrawn from the HRSG 122. A partially cooled carbon dioxide rich flue gas stream in line 185 is withdrawn from the heat recovery section 121. A partially cooled carbon dioxide rich flue gas stream in line 185 is treated to remove impurities. The flue gas outlet temperature from the HRSG 122 for a partial combustion regenerator, or the full combustion regenerator 125 may range from about 150° C. to about 290° C.

In an aspect, the disclosed process may comprise a regenerator 125 operating under partial burn or partial combustion mode. For a partial burn regenerator, the heat recovery section 121 includes a CO combustor 151 upstream of the HRSG 122. When the regenerator unit 150 is operating under partial burn, a portion of the stream of carbon dioxide and oxygen in line 135 may be taken in line 136 and passed to the CO combustor 151.

In partial burn operation, the flue gas stream in line 150 is first sent to the CO combustor in the heat recovery section 121 to oxidize the carbon monoxide present in the flue gas stream in line 150 to carbon dioxide. A fully combusted stream in line 152 from the carbon monoxide combustor is then sent to the HRSG 122 in the heat recovery section 121. In an exemplary embodiment, the flue gas outlet temperature for the regenerator 125 for a partial combustion or a full combustion operation may range from about 670° C. to about 740° C. or from about 650° C. to about 700° C. The flue gas temperature departing the CO combustor may range from about 890° C. to about 1040° C.

In many embodiments, a HRSG 122 is included upstream of the decontamination section 190. In the decontamination section 190, the impurities present in the partially cooled flue gas stream in line 185 may be separated and a purified partially cooled flue gas stream is provided. In an exemplary embodiment, the decontamination section 190 comprises a decontamination reactor 195 and a filtration section 200. The partially cooled flue gas stream in line 185 is passed to the decontamination reactor 195. A reactant in line 210 is also passed to the decontamination reactor 195. In an aspect, the reactant in line 210 may include a dry reactant or a solution/slurry stream of reactant. Depending upon the system hydraulics, a blower (not shown in the figure) may be added either upstream or downstream of the decontamination reactor 195 to increase the pressure of the flue gas stream.

In some embodiments, the NOx compounds are reacted in a NOx reaction section (not shown) before the decontamination reactor 190. The NOx reaction section may comprise a selective catalytic reduction (SCR) reactor to form a NOx reactor effluent stream with a reduced level of nitrogen oxide-containing compounds compared to the incoming stream. Any suitable SCR catalyst could be used, including but not limited to, ceramic carrier materials such as titanium oxide with active catalytic components such as oxides of base metals including $TiO_2$, $WO_3$ and $V_2O_5$, or an activated carbon-based catalyst. An ammonia and/or urea stream is introduced into the NOx reactor section where it reacts with the NOx present in the incoming stream. If a NOx reaction section is included, the effluent stream from the NOx reaction section contains a lower concentration of NOx compounds than the concentration of NOx compounds in the incoming stream.

In an exemplary embodiment, the reactant in line 210 is in dry form. For a dry reactant, the partially cooled flue gas stream in line 185 from the heat recovery section 121 and a dry reactant stream in line 210 are sent to the decontamination reactor 195 where the reactant reacts with the sulfur-containing compounds and/or nitrogen-containing compound in the partially cooled flue gas stream in line 185 to form a reactor effluent stream comprising reactant salt or reaction product. In an exemplary embodiment, the decontamination reactor 195 may operate at a temperature from about 200° C. to about 600° C. or from about 300° C. to about 600° C. for reacting one or more of the sulfur-containing compounds, the nitrogen-containing compound, or both in the partially cooled flue gas stream in line 185 with the reactant stream in line 210 in dry form. In another exemplary embodiment, the reactant stream in line 210 comprises one or more of sodium bicarbonate ($NaHCO_3$), calcium hydroxide ($Ca(OH)_2$) and trona salt ($Na_2CO_3 \cdot NaHCO_3 \cdot 2H_2O$). In yet another exemplary embodiment, the reactant salt comprises one or more of sodium sulphate ($Na_2SO_4$), sodium carbonate ($Na_2CO_3$) and sodium nitrate ($NaNO_3$). The reactor effluent stream comprising a reactant salt is passed to the filter section 200 for particle removal.

The filter section 200 removes particulates, reactant salt, and catalyst fines from the reactor effluent stream. In an exemplary embodiment, SOx reaction products are filtered out of the dry SOx reaction section flue gas stream in the filtration section 200 forming a filtered material stream in line 215. Electricity may be supplied to the filter section 200 when the filter section 200 comprises an electrostatic precipitator. The filter section 200 may also comprise a bag filter. The filtered material from the filter section 200 may comprise the reactant salt, and catalyst fines which may be removed in the filter section 200. A filtered material can be removed from the process in line 215. Alternatively, or additionally, a filtered material may be recycled to the decontamination reactor 195. A filtered reactor effluent stream in line 220 purified of SOx and/or NOx is passed to the carbon dioxide separation section 111 to separate a carbon dioxide product stream from the filtered reactor effluent stream. The separation section 111 may comprise one or more heat exchangers, coolers, knock out drums (KOD), heaters, and compressors.

Because the reactant is used in dry form, the filtered reactor effluent stream in line 220 is still has a significantly high temperature. Heat/energy can still be recovered from the filtered reactor effluent stream in line 220. The filtered reactor effluent stream in line 220 may be passed through an optional first heat exchanger 225 to recover some heat from the filtered reactor effluent stream in line 220 before passing it to the downstream separation section 111. A first heat exchanged flue gas stream in line 230 may be sent to a second heat exchanger 235 where it is heat exchanged with a first carbon dioxide recycle stream in line 344 to form a first preheated carbon dioxide recycle stream in line 347 and a second cooled flue gas stream in line 250. The second cooled flue gas stream in line 250 may be cooled or optionally condensed in a third heat exchanger 251 to provide an ultimately cooled flue gas stream in line 253. The ultimately cooled flue gas stream in line 253 is separated to provide a carbon dioxide product stream, a carbon dioxide recycle stream, and an oxygen rich stream.

After heat exchange, the ultimately cooled flue gas stream in line 253 is passed to a knock-out drum (KOD) 255 to remove a water stream in line 260 and form a partially dehydrated flue gas stream in line 265. From the KOD overhead, the partially dehydrated flue gas stream in line 265 is passed to the dehydration unit 280. A water stream in line 260 is withdrawn from a bottom of the KOD 255. In an exemplary embodiment, the partially dehydrated flue gas stream in line 265 comprises water of about less than 15 vol % or about less than 10 vol % or about less than 5 vol %.

The partially dehydrated flue gas stream in line 265 may be compressed in a compressor 270 before passing it to the dehydration unit 280. The dehydration unit 280 dehydrates the stream 285 to prevent hydrate (ice) formation under cryogenic conditions in the cryogenic fractionation column 290. Solid and liquid desiccants both may be used for this purpose. In an exemplary embodiment, the partially dehydrated flue gas stream in line 265 may be compressed to a pressure of about 3,000 to about 6,000 kPa (a) in the compressor 270. A compressed flue gas stream in line 275 is passed to the dehydration unit 280. The dehydration unit 280 may be operated at a pressure of about 3000 kPa (a) (60 psia) to about 6000 kPa (a) (600 psia) and a temperature of about 10° C. (50° F.) to about 66° C. (50° F.). In the dehydration unit 280, water is removed from the compressed or the partially dehydrated flue gas stream to produce a dehydrated flue gas stream in line 285. A water stream is removed from the dehydration unit 280 in line 282.

In an aspect, the dehydrated flue gas stream in line 285 may be separated in a cryogenic fractionation unit. In an embodiment, the cryogenic fractionation unit comprises a cryogenic fractionation column 290 and a compressor 292. In accordance with the present disclosure, the cryogenic fractionation column 290 may be operated at a temperature of about –20° C. to about –50° C. and a pressure about 3000 kPa (a) to 6000 kPa (a). From the cryogenic fractionation column, a liquid CO2 stream is recovered. A mixed refrigerant stream is used in the cryogenic fractionation column for recovering the liquid CO2 stream. The compressor 292 is used to compress the mixed refrigerant stream which is then expanded to extract the cooling duty for the cryogenic fractionation unit. In an aspect, the mixed refrigerant stream may comprise hydrocarbon and non-hydrocarbon components which may be selected suitably to provide the most efficient cooling duty to the cryogenic fractionation column 290.

The dehydrated flue gas stream in line 285 may be optionally combined with a compressed oxygen rich stream in line 308 to provide a combined dehydrated flue gas stream in line 286. The combined dehydrated flue gas stream in line 286 is passed to the cryogenic fractionation column 290. In the cryogenic fractionation column 290, the combined dehydrated flue gas stream in line 286 or if there is no recycle of the compressed oxygen rich stream in line 308, the dehydrated flue gas stream in line 285 is fractionated to separate oxygen from carbon dioxide. A mixed refrigerant stream is also used in the cryogenic fractionation column 290 to recover the liquid CO2 stream from the combined dehydrated flue gas stream in line 286 or the dehydrated flue gas stream in line 285. The mixed refrigerant stream is compressed in the compressor 292 and then expanded to extract the cooling duty for the cryogenic fractionation unit. An oxygen rich stream in line 300 is withdrawn from the cryogenic fractionation column 290. A carbon dioxide product stream is separated from the cryogenic fractionation column 290 in line 295. In an aspect, a carbon dioxide stream in line 325 taken from the carbon dioxide product stream in line 295 may be recycled to provide the stream of carbon dioxide and oxygen in line 135.

The oxygen rich stream in line 300 may be further treated to provide a purified oxygen stream. In accordance with the present disclosure, the oxygen rich stream in line 300 comprises at least about 50 mole % oxygen and at least about 10 mole % carbon dioxide. In an aspect, the oxygen rich stream in line 300 comprises about 50 to about 90 mol % oxygen and about 10 to about 50 mol % carbon dioxide. In an exemplary embodiment, the oxygen rich stream in line 300 is separated into a first oxygen rich stream in line 302 and a second oxygen rich stream in line 304. In an aspect, the second oxygen rich stream in line 304 may be expanded to extract energy. The first oxygen rich stream in line 302 is compressed in a compressor 307 to provide a compressed oxygen rich stream in line 308. The compressed oxygen rich stream in line 308 is recycled to the cryogenic fractionation column 290 to recover carbon dioxide from it. The second oxygen rich stream in line 304 may be passed through an expander 305 or a compressor 305 or a JT Valve 305 to provide a purified oxygen stream in line 310. The purified oxygen stream in line 310 may be further used in the process 101 such as supplemental oxygen supply gas to the regenerator 125 or purged to atmosphere. Also, the purified oxygen stream in line 310 may be used for supplemental oxygen supply gas to the process.

Returning back to the cryogenic fractionation column 290, optionally the carbon dioxide product stream in line 295 may be separated into a recycle carbon dioxide product stream in line 325 and a net carbon dioxide product stream in line 296. The net carbon dioxide product stream in line 296 may be withdrawn. Optionally, the recycle carbon dioxide product stream in line 325 may be recycled to the regenerator 125. In an exemplary embodiment, the recycle carbon dioxide product stream in line 325 may comprise from about 10% to about 60% of the carbon dioxide product stream in line 295. In accordance with an exemplary embodiment of the present disclosure, the carbon dioxide product stream in line 296 may comprise from about 10% to about 70% of the heat exchanged carbon dioxide recycle stream in line 140.

Referring back to the KOD 255, the partially dehydrated flue gas stream in line 265 may be separated to provide a carbon dioxide recycle stream before passing to the downstream cryogenic fractionation column 290. In an exemplary embodiment, the partially dehydrated flue gas stream in line 265 may be split into a first partially dehydrated flue gas stream in line 266 and a second partially dehydrated flue gas stream in line 330. The first partially dehydrated flue gas stream in line 266 may be passed to the dehydration unit 280 and processed as previously described.

The second partially dehydrated flue gas stream in line 330 may be recycled to the regenerator 125. In an aspect, the second partially dehydrated flue gas stream in line 330 may be compressed in a compressor 335 to provide a carbon dioxide recycle stream in line 140 which may be passed to the regenerator 125. In another exemplary embodiment, the second partially dehydrated flue gas stream in line 330 may be separated into a first carbon dioxide recycle stream in line 340 and a second carbon dioxide recycle stream in line 341. The first carbon dioxide recycle stream in line 340 may be sent to the second heat exchanger 235 to exchange heat with the first heat exchanged flue gas stream in line 230. In an exemplary embodiment, the first carbon dioxide recycle stream in line 340 may be combined with a recycle carbon dioxide product stream in line 325 to provide a combined carbon dioxide recycle stream in line 344. The combined carbon dioxide recycle stream in line 344 may be heat exchanged with the first heat exchanged flue gas stream in line 230 in the second heat exchanger 235. Optionally, the recycle carbon dioxide product stream in line 325 may be passed to an expansion valve 327 to provide an expanded recycle carbon dioxide product stream in line 328. The expanded recycle carbon dioxide product stream in line 328 may be combined with the first carbon dioxide recycle stream in line 340. Optionally, the net carbon dioxide product stream in line 296 may be used as coolant stream (not shown) in third heat exchanger 251 before being routed to a product destination. Alternatively, the net carbon dioxide product stream in line 296 may be used as coolant stream (not shown) to maintain an optimum temperature of the compressed flue gas stream in line 275 before it is routed to the dehydration unit 280.

After heat exchange in the second heat exchanger 235, a first preheated carbon dioxide recycle stream in line 347 is provided. The second carbon dioxide recycle stream in line 341 may be combined with the first preheated carbon dioxide recycle stream in line 347 to provide a combined carbon dioxide recycle stream in line 342. The combined carbon dioxide recycle stream in line 342 may be compressed in a compressor 335 to provide a compressed carbon dioxide recycle stream in line 346. The compressed carbon dioxide recycle stream in line 346 may be passed through a heat exchanger 345 to recover some heat and provide a cooled carbon dioxide recycle stream in line 140 which may be passed to the regenerator 125. In an aspect, the compressed carbon dioxide recycle stream in line 346 is cooled by heat exchange in the heat exchanger 345. In another aspect, the heat exchanged carbon dioxide recycle stream in line 140 is a preheated carbon dioxide recycle stream.

In an embodiment, the second partially dehydrated flue gas stream in line 330 is optionally separated into the first carbon dioxide recycle stream in line 340 and the second carbon dioxide recycle stream in line 341. In an aspect, the entirety of the second partially dehydrated flue gas stream in line 330 may be passed to the regenerator 125 in line 341.

In an aspect, the heat exchanged carbon dioxide recycle stream in line 140 may be combined with an oxygen stream in line 145 to provide a stream of carbon dioxide and oxygen in line 135. The oxygen stream in line 145 may be taken from an oxygen source 141. In an embodiment, the oxygen source 141 for providing the oxygen stream 145 can be selected from an air separation unit (ASU) or an electrolyzer. In an exemplary embodiment, the oxygen source 141 is an electrolyzer.

Various types of electrolyzers may be used as the electrolyzer 141 including but not limited to a polymer electrolyte membrane/proton exchange membrane (PEM/PEMEC), an alkaline electrolysis cell (AEC), an anion exchange membrane (AEM), and a solid oxide electrolysis cell (SOE/SOEC). In accordance with the present disclosure, the utilities generated in the fluidized catalytic process could be used in the electrolysis section of the electrolyzer 141. For PEM, AEC, AEM and SOEC electrolyzers, the electricity generated in a power recovery section could be used. In addition, for a SOEC electrolyzer, heat in the form of steam could be used in SOEC to reduce the need for utilities generated and exported into the process and apparatus 101. For the SOEC electrolyzer, about 25% to about 30% of the total energy requirement could be supplied by heat. In an exemplary embodiment, heat generated from the regenerator in the flue gas may be supplied to the SOEC electrolyzer. Apart from taking heat from the regenerator flue gas, other sources of heat are also envisioned for integration, such as heat taken from the main column overhead of an FCC unit. Furthermore, apart from using electricity for splitting water, electricity generated in the process unit as disclosed earlier could also be used for compression in the electrolyzer such as in AEC, AEM, and PEM electrolyzer. In an aspect, the electrolyzer 141 may use the thermal energy or steam generated in the catalyst regeneration process.

Referring to FIG. 1, the oxygen source 141 may be an electrolyzer 141. The electrolyzer 141 can be selected from one or more electrolyzers including but not limited to polymer electrolyte membrane/proton exchange membrane (PEM/PEMEC), alkaline electrolysis cell (AEC), anion exchange membrane (AEM), and solid oxide electrolysis cell (SOE/SOEC) as previously mentioned. An air stream in line 142, and a water stream in line 144 are provided to the electrolyzer 141. Heat 143 is also provided to the electrolyzer 141 from any suitable heat source. In an exemplary embodiment, the heat 143 to the electrolyzer 141 is supplied from any suitable process unit of the fluid catalytic unit. However, heat to the electrolyzer 141 can be supplied from any other heat sources. The various utilities generated in the fluid catalytic unit can be used in the electrolyzer 141. In an aspect, electricity from the expander 305, the superheated steam stream in line 172 from the superheated steam section 155 of the HRSG 121, and the saturated steam stream in line 163 from the saturated steam section 165 of the HRSG 122 may also be passed to the electrolyzer 141. An oxygen stream is withdrawn in line 145 from the electrolyzer 141 and combined with the heat exchanged carbon dioxide recycle stream in line 140 to provide the stream of carbon dioxide and oxygen in line 135 which is passed to the regenerator 125.

Figure 2:
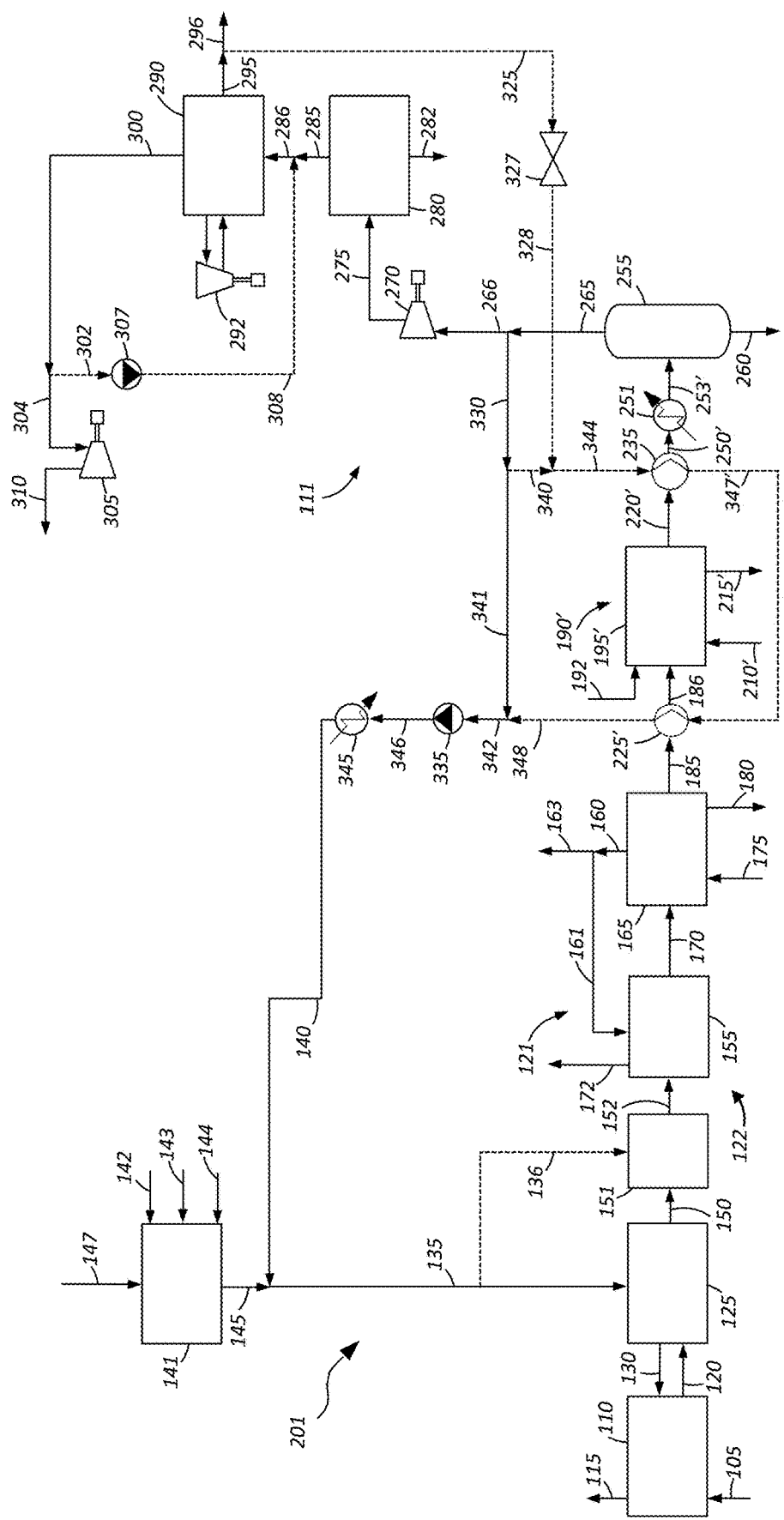
FIG. 2 is a schematic diagram of a process for separating a carbon dioxide product stream from a flue gas stream in accordance with another exemplary embodiment.

Turning now to FIG. 2, another exemplary embodiment of a process for separating a carbon dioxide product stream from a flue gas stream is addressed with reference to a process and apparatus 201. Elements of FIG. 2 may have the same configuration as in FIG. 1 and bear the same respective reference number and have similar operating conditions. The process 201 for separating a carbon dioxide product stream from a flue gas stream comprises a decontamination section operating under a wet condition for removing one or more of a sulfur-containing compound, a nitrogen-containing compound, or both in the flue gas stream.

The partially cooled flue gas stream in line 185 is treated in the decontamination section 190' to remove the contaminants. In an exemplary embodiment, the partially cooled flue gas stream in line 185 is heat exchanged with a carbon dioxide recycle stream in a first heat exchanger 225' to provide a heat exchanged cooled flue gas stream in line 186. After heat exchange, the heat exchanged cooled flue gas stream in line 186 is passed to the decontamination section 190' comprising a decontamination reactor 195'. In an embodiment, the first heat exchanger 225' is optional and the partially cooled flue gas stream in line 185 may be passed directly to the decontamination reactor 195'. In the embodiment shown in process 201, the decontamination reactor 195' comprises a wet SOx reaction section to remove SOx compounds from the flue gas stream in line 186. A stream comprising an alkaline solution in line 210' is passed to the decontamination reactor 195'. Optionally, an ozone stream in line 192 may be also passed to the decontamination reactor 195'. In the wet SOx reaction section, the alkaline solution reacts with the SOx compounds in the heat exchanged cooled flue gas stream in line 186, the optional ozone reacts with NOx compounds in the heat exchanged cooled flue gas stream in line 186, and water washing removes the particulate matter in the heat exchanged cooled flue gas stream in line 186 to form a reactor effluent stream. A liquid slurry stream is separated from the reactor effluent stream and withdrawn in line 215'. A reactor effluent gas stream in line 220' is passed to the carbon dioxide separation section 111 to separate carbon dioxide product stream.

The reactor effluent gas stream in line 220' may be sent to a second heat exchanger 235 where it is heat exchanged with a first carbon dioxide recycle stream in line 340 to provide a first partially preheated carbon dioxide recycle stream in line 347' and a second cooled flue gas stream in line 250'. The second cooled flue gas stream in line 250' may be cooled or optionally condensed in a third heat exchanger 251 to provide an ultimately cooled flue gas stream in line 253'. The ultimately cooled flue gas stream in line 253' is passed to the KOD 255. The first partially preheated carbon dioxide recycle stream in line 347' may be heat exchanged with the partially cooled flue gas stream in line 185 in the first heat exchanger 225' to provide a first preheated carbon dioxide recycle stream in line 348. The first preheated carbon dioxide recycle stream in line 348 may be combined with the second preheated carbon dioxide recycle stream in line 341 to provide a heat exchanged carbon dioxide recycle stream in line 140 which is passed to the regenerator 125 via line 135. In an embodiment, the first partially preheated carbon dioxide recycle stream in line 347' may be combined with the second preheated carbon dioxide recycle stream in line 346 to provide the heat exchanged carbon dioxide recycle stream in line 140. The rest of the process is the same as described in FIG. 1.

Figure 3:
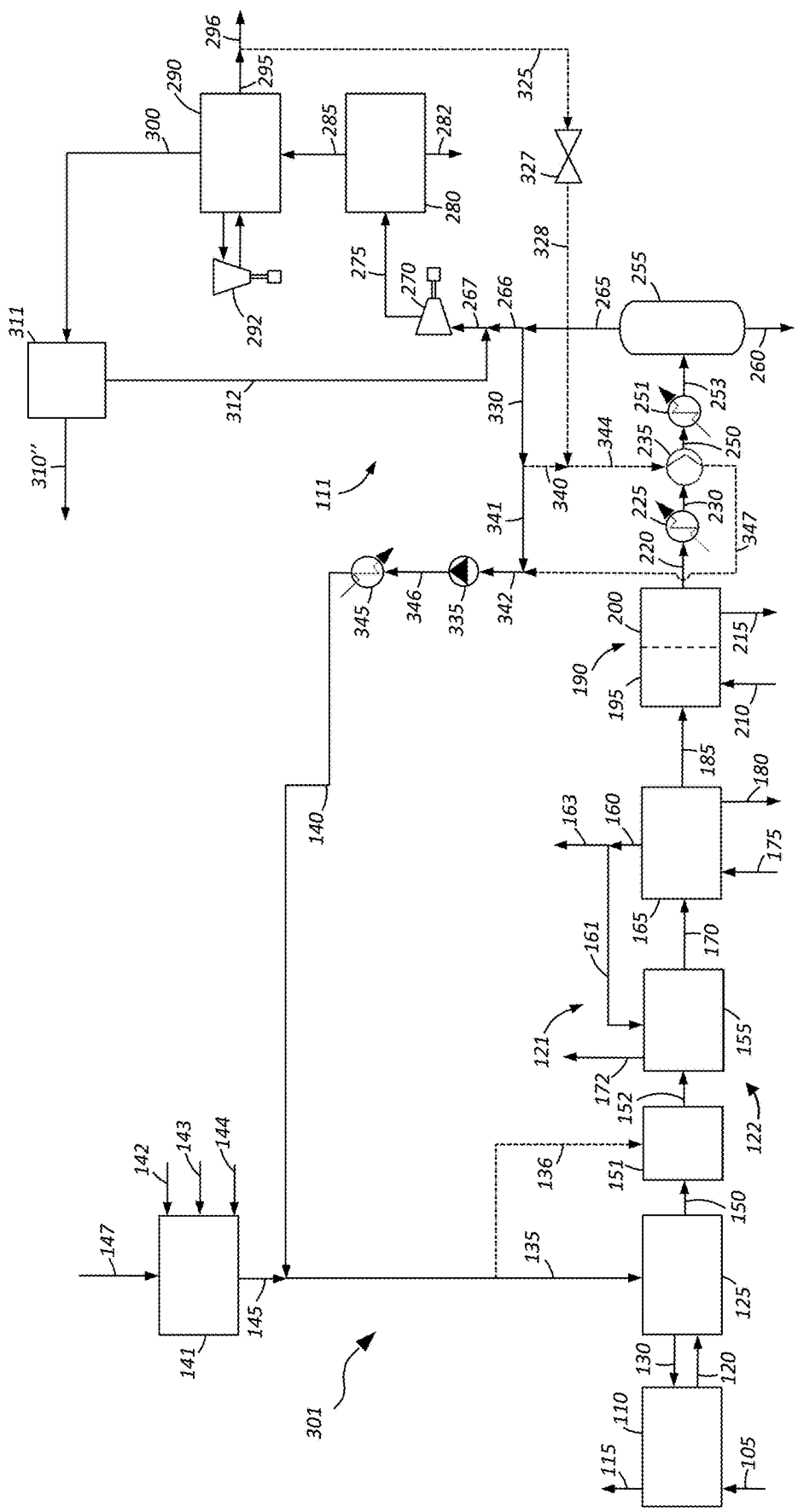
FIG. 3 is a schematic diagram of a process for separating a carbon dioxide product stream from a flue gas stream in accordance with yet another exemplary embodiment.

Yet another exemplary embodiment of a process and an apparatus for separating a carbon dioxide product stream from a flue gas stream is addressed with reference to a process and apparatus 301 as shown in FIG. 3. Elements of FIG. 3 may have the same configuration as in FIG. 1 and bear the same respective reference number and have similar operating conditions. The process and apparatus for regenerating catalyst from a fluidized catalytic process as shown in FIG. 3 comprise a pressure swing absorption (PSA) unit 311 in addition to the elements shown in FIG. 1.

The oxygen rich stream in line 300 may comprise contaminants that may be separated from the oxygen. The oxygen rich stream in line 300 may comprise contaminants such as carbon dioxide, carbon monoxide (trace), nitrogen, and argon. The oxygen rich stream in line 300 may also comprise carbon dioxide which can be further separated to enhance the yield of carbon dioxide in the carbon dioxide product stream. In the embodiment shown in process 301, the oxygen rich stream in line 300 may be passed to a PSA unit 311. In the PSA unit 311, carbon dioxide is separated from the oxygen in a PSA tail gas stream in line 312.

The oxygen rich stream in line 300 is fed to the PSA unit which includes multiple beds of an adsorbent such as alumina, silica gel, zeolite, activated carbon, metal organic framework (MOF) or combination thereof. At high pressure such as 3000 kPa (a) to 6000 kPa (a), the carbon dioxide and heavy components adsorb into the pores of the adsorbent while the oxygen and lighter molecules pass through the bed to generate the purified oxygen stream in line 310". The adsorption step is continued until the mass transfer zone of preferentially adsorbed component reaches the exit end of the bed without substantially breaking through it to the purified oxygen stream in line 310". Thereafter, the pressure of the PSA unit is reduced and the adsorbed carbon dioxide and other components are desorbed into a lower pressure tail gas stream in line 312. The PSA tail gas stream in line 312 may be recycled to the cryogenic fractionation column 290 to recover additional carbon dioxide in the carbon dioxide product stream 295. The PSA tail gas stream in line 312 may be a low-pressure carbon dioxide-containing stream. The PSA tail gas stream in line 312 may be compressed in a compressor and recycled to the cryogenic fractionation column 290. In an exemplary embodiment, the PSA tail gas stream in line 312 may be combined with the first partially dehydrated flue gas stream in line 266 to form a mixed partially dehydrated flue gas stream in line 267. The mixed partially dehydrated flue gas stream in line 267 may be compressed in a compressor 270 to provide a compressed partially dehydrated flue gas stream in line 275. The compressed partially dehydrated flue gas stream in line 275 may be dehydrated in the dehydration unit 280 to provide the dehydrated flue gas stream in line 285.

Returning back to the PSA unit 311, a purified oxygen stream in line 310" is withdrawn from an overhead of the PSA unit 311. The purified oxygen stream in line 310" is a high-pressure overhead stream from the PSA unit 311. The rest of the process is the same as described in FIG. 1.

Figure 4:
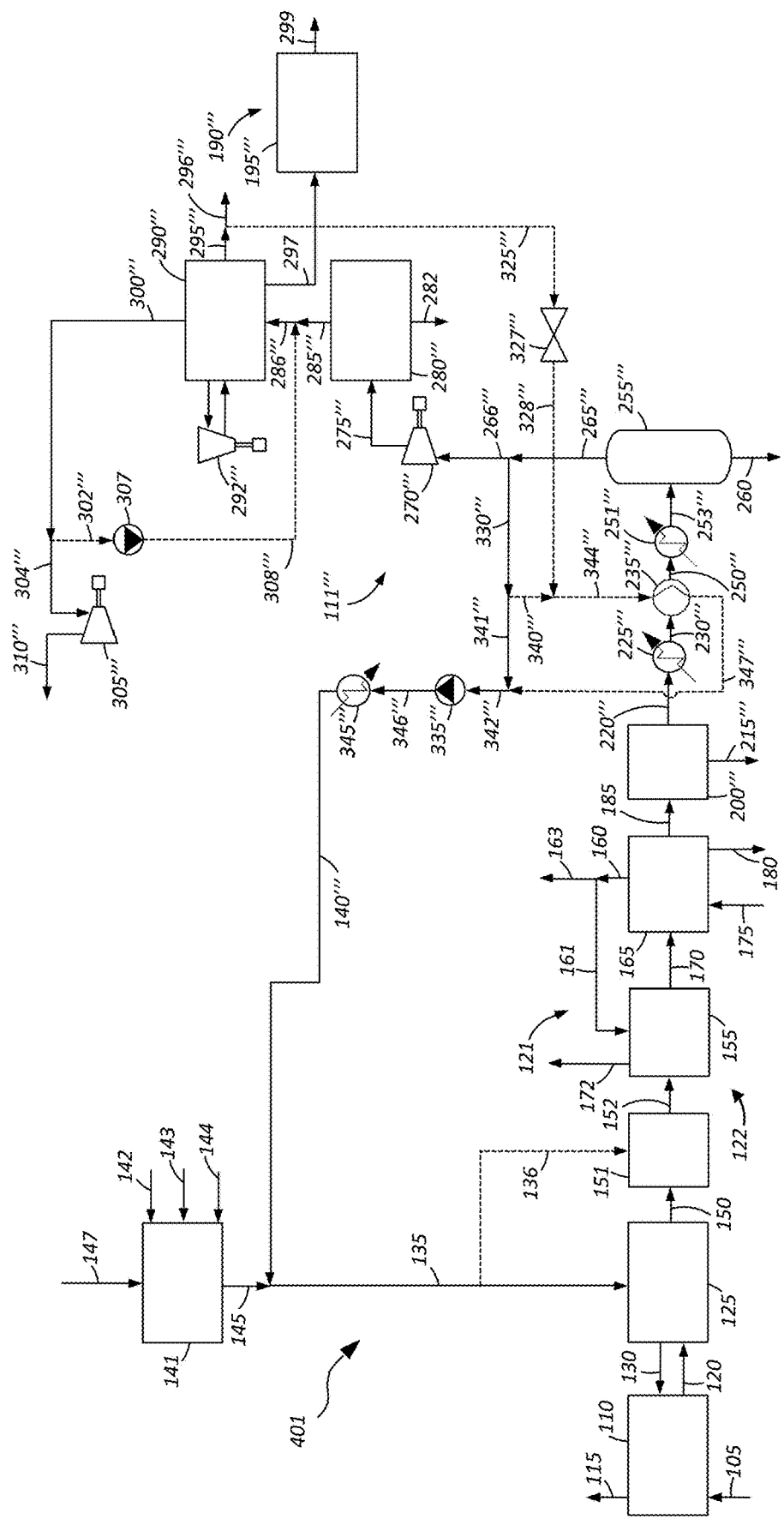
FIG. 4 is a schematic diagram of a process for separating a carbon dioxide product stream from a flue gas stream in accordance with still another exemplary embodiment.

Another exemplary embodiment of a process and an apparatus for separating a carbon dioxide product stream from a flue gas stream is addressed with reference to a process and apparatus 401 as shown in FIG. 4. Elements of FIG. 4 may have the same configuration as in FIG. 1 and bear the same respective reference number and have similar operating conditions.

In the embodiment shown in the process 401, the decontamination section 190''' is in downstream and perhaps direct communication with the cryogenic fractionation column 290. As shown in FIG. 4, the decontamination section 190''' comprises a decontamination reactor 195. In this embodiment, a filtration section 200''' may be located upstream of the decontamination section 190 to remove or filter particulates upstream of the decontamination section 190 and the inlet stream to the decontamination reactor 195 may comprise a filtered effluent.

The partially cooled flue gas stream in line 185 may be passed through the filtration section 200''' to remove particulates and catalyst fines from the partially cooled flue gas stream in line 185. One or more of the particulates and catalyst fines are removed in a filtered material stream in line 215''' from the filtration section 200'''. Electricity may be supplied to the filter section 200''' when the filter section 200''' comprises an electrostatic precipitator. The filter section 200''' may also comprise a bag filter. A filtered flue gas stream is withdrawn from the filter section 200''' in line 220'''. The filtered flue gas stream in line 220''' may be passed through an optional first heat exchanger 225''' to recover some heat before passing it to the downstream separation section 111'''. A first heat exchanged filtered flue gas stream in line 230''' may be sent to a second heat exchanger 235''' where it is heat exchanged with a first carbon dioxide recycle stream in line 344''' to form a first preheated carbon dioxide recycle stream in line 347''' and a second cooled filtered flue gas stream in line 250'''. The second cooled filtered flue gas stream in line 250''' may be cooled or optionally condensed in a third heat exchanger 251''' to provide an ultimately cooled filtered flue gas stream in line 253'''. The ultimately cooled filtered flue gas stream in line 253''' is separated to provide a carbon dioxide product stream, a carbon dioxide recycle stream, and an oxygen rich stream.

After heat exchange, the cooled filtered flue gas stream in line 253''' is passed to a knock-out drum (KOD) 255''' to remove a water stream in line 260 and form a partially dehydrated flue gas stream in line 265'''. From the KOD overhead, the partially dehydrated flue gas stream in line 265''' is passed to the dehydration unit 280'''. A water stream in line 260 is withdrawn from the KOD 255'''.

The partially dehydrated flue gas stream in line 265''' may be compressed in a compressor 270 before passing it to the dehydration unit 280'''. A compressed flue gas stream in line 275''' is passed to the dehydration unit 280'''. In the dehydration unit 280''', water is removed from the compressed or the partially dehydrated flue gas stream to produce a dehydrated flue gas stream in line 285'''. A water stream in line 282 is removed from the dehydration unit 280'''.

In an aspect, the dehydrated flue gas stream in line 285''' may be separated in a cryogenic fractionation column 290'''. In an embodiment, the cryogenic fractionation column comprises a cryogenic fractionation column 290''' and a compressor 292'''. The dehydrated flue gas stream in line 285''' may be optionally combined with a compressed oxygen rich stream in line 308''' to provide a combined dehydrated flue gas stream in line 286'''. The combined dehydrated flue gas stream in line 286''' is passed to the cryogenic fractionation column 290'''. In the cryogenic fractionation column 290''', the combined dehydrated flue gas stream in line 286''' or the dehydrated flue gas stream in line 285''' is fractionated to separate oxygen in an overhead line 300''', carbon dioxide in an intermediate stream 295''' perhaps from the side of the column and a bottoms stream comprising a heavier liquid stream in line 297. An oxygen rich stream in line 300''' is withdrawn from the cryogenic fractionation column 290'''. A carbon dioxide product stream is separated from the cryogenic fractionation column 290''' in line 295'''.

A heavier liquid stream in line 297 is also withdrawn from a bottom of the cryogenic fractionation column 290'''. The heavier liquid stream in line 297 comprises sulfur oxides and/or nitrous oxides. The heavier liquid stream in line 297 may be treated to recover the sulfur oxides and/or nitrous oxides. In the embodiment shown in process 401, the heavier liquid stream in line 297 is passed to a decontamination section 190''' to remove contaminants and provide an effluent stream in line 299 having substantially lesser contaminants including sulfur oxides and/or nitrous oxides as compared to the heavier liquid stream in line 297. The decontamination section 190''' comprises a decontamination reactor 195'''.

In an exemplary embodiment, the heavier liquid stream in line 297 may be contacted and treated with a reactant in the decontamination reactor 195'''. A reactant (not shown) may be passed to the decontamination reactor 195'''. In the decontamination reactor 195''', the reactant reacts with the sulfur-containing compounds and/or nitrogen-containing compound in the heavier liquid stream in line 297. The reacted compounds may be separated and the effluent stream in line 299 is withdrawn from the decontamination reactor 195'''.

Returning to the KOD 255''', the partially dehydrated flue gas stream in line 265''' may be separated to provide a carbon dioxide recycle stream before passing to the downstream cryogenic fractionation column 290. In an exemplary embodiment, the partially dehydrated flue gas stream in line 265''' may be separated into a first partially dehydrated flue gas stream in line 266''' and a second partially dehydrated flue gas stream in line 330'''. The first partially dehydrated flue gas stream in line 266''' may be passed to the dehydration unit 280''' and processed as previously described.

The second partially dehydrated flue gas stream in line 330''' may be recycled to the regenerator 125. In an aspect, the second partially dehydrated flue gas stream in line 330''' may be compressed in a compressor 335''' to provide a carbon dioxide recycle stream in line 140''' which may be passed to the regenerator 125. In an exemplary embodiment, second partially dehydrated flue gas stream in line 330''' may be separated into an optional first carbon dioxide recycle stream in line 340''' and a second carbon dioxide recycle stream in line 341'''. The first carbon dioxide recycle stream in line 340''' may be sent to the second heat exchanger 235''' to heat exchange with the first heat exchanged filtered flue gas stream in line 230'''. In an exemplary embodiment, the first carbon dioxide recycle stream in line 340''' may be combined with a recycle carbon dioxide product stream in line 325''' to provide a combined carbon dioxide recycle stream in line 344'''. In aspect, the recycle carbon dioxide product stream in line 325''' may be passed to an expansion valve 327''' to provide an expanded recycle carbon dioxide product stream in line 328''' which may be combined with the first carbon dioxide recycle stream in line 340'''. The combined carbon dioxide recycle stream in line 344''' may be heat exchanged with the first heat exchanged filtered flue gas stream in line 230''' in the second heat exchanger 235'''. After heat exchange in the second heat exchanger 235''', a first preheated carbon dioxide recycle stream in line 347''' is provided. The second carbon dioxide recycle stream in line 341''' may be combined with the first preheated carbon dioxide recycle stream in line 347''' to provide a combined carbon dioxide recycle stream in line 342'''. The combined carbon dioxide recycle stream in line 342''' may be compressed in a compressor 335''' to provide a compressed carbon dioxide recycle stream in line 346'''. The compressed carbon dioxide recycle stream in line 346''' may be passed through a heat exchanger 345''' to recover some heat and provide a heat exchanged carbon dioxide recycle stream in line 140''' which may be passed to the regenerator 125. In an aspect, the compressed carbon dioxide recycle stream in line 346''' is cooled by heat exchange in the heat exchanger 345'''. In another aspect, the heat exchanged carbon dioxide recycle stream in line 140''' is a preheated carbon dioxide recycle stream. The rest of the process and the description is the same as described in FIG. 1.

Any of the above lines, conduits, units, devices, vessels, surrounding environments, zones or similar may be equipped with one or more monitoring components including sensors, measurement devices, data capture devices or data transmission devices. Signals, process or status measurements, and data from monitoring components may be used to monitor conditions in, around, and on process equipment. Signals, measurements, and/or data generated or recorded by monitoring components may be collected, processed, and/or transmitted through one or more networks or connections that may be private or public, general or specific, direct or indirect, wired or wireless, encrypted or not encrypted, and/or combination(s) thereof; the specification is not intended to be limiting in this respect. Further, the figure may include one or more exemplary sensors located on one or more conduits. Nevertheless, there may be sensors present on every stream so that the corresponding parameter(s) can be controlled accordingly.

Signals, measurements, and/or data generated or recorded by monitoring components may be transmitted to one or more computing devices or systems. Computing devices or systems may include at least one processor and memory storing computer-readable instructions that, when executed by the at least one processor, cause the one or more computing devices to perform a process that may include one or more steps. For example, the one or more computing devices may be configured to receive, from one or more monitoring component, data related to at least one piece of equipment associated with the process. The one or more computing devices or systems may be configured to analyze the data. Based on analyzing the data, the one or more computing devices or systems may be configured to determine one or more recommended adjustments to one or more parameters of one or more processes described herein. The one or more computing devices or systems may be configured to transmit encrypted or unencrypted data that includes the one or more recommended adjustments to the one or more parameters of the one or more processes described herein.

EXAMPLE

Simulation studies were performed using Unisim simulation software. Two simulation studies were performed for a carbon dioxide product stream separated in the $CO_2$ separation section 111 from the process streams. Details of the studies are in Example 1 and Example 2 below.

Example 1

In the first simulation study, the $CO_2$ separation section 111 included a dehydration unit (280) and cryogenic fractionation column (290). The overhead stream from the cryogenic fractionation column was utilized to provide cooling duty to the inlet stream of the cryogenic fractionation column and then it exited the $CO_2$ fractionation system as the oxygen rich stream (300). Various parameters and the material balances of the streams are listed in Table 1 below:

TABLE 1

| Stream | | 266 | 285 | 296 | 310 |
|---|---|---|---|---|---|
| Temperature, °C. (° F.) | | 48.8 (120) | 70 (158) | 28 (82) | 25 (77) |
| Pressure, kPa(g) (psig) | | 1.72 (0.25) | 4157.5 (603) | 6757 (980) | 34.5 (5) |
| Mass Flow, kg/hr (lb/hr) | | 50270 (110827) | 47833 (105453) | 47362 (102210) | 1354 (2986) |
| Composition, mol % | $H_2O$ | 11.4 | 0.6 | 0 | 0 |
| | $O_2$ | 2.1 | 2.3 | 10 ppm | 63.6 |
| | $N_2$ | 0.5 | 0.6 | 0 | 16.2 |
| | CO | 0 | 0 | 0 | 0 |
| | $CO_2$ | 86.0 | 96.5 | 99.9+ | 20.2 |
| | $SO_2$ | <10 ppm | <10 ppm | <10 ppm | 0 |
| | $SO_3$ | <10 ppm | <10 ppm | <10 ppm | 0 |
| | NO | <10 ppm | <10 ppm | 0 | <300 ppm |
| | $NO_2$ | <10 ppm | <10 ppm | <10 ppm | 0 |

The $CO_2$ separation section 111 with the cryogenic fractionation column produced a high CO2 purity of about 99+mol %. Also, a high $CO_2$ recovery of about 95+% was observed. An oxygen stream was produced which was greater than 63 mol % oxygen. Temperatures and pressures of the $CO_2$ fractionation system can be set to target the required $CO_2$ purity. In this study, these parameters were set by the oxygen level in the $CO_2$ product stream which was found to be about 10 ppm.

Example 2

In the second simulation study, the $CO_2$ separation section 111 included a dehydration unit (280), cryogenic fractionation column (290), and a pressure swing adsorption unit (311). The overhead stream from the cryogenic fractionation column was utilized to provide cooling duty to the inlet of the cryogenic fractionation column and then was sent to the pressure swing adsorption unit (311) as the oxygen rich stream (300). The pressure swing adsorption unit (311) recycled a tail gas (312) to the inlet of the $CO_2$ separation section to maximize $CO_2$ capture. Various parameters and the material balances of the streams are listed in Table 2 below.

TABLE 2

| Stream | | 266 | 285 | 296 | 310" | 312 |
|---|---|---|---|---|---|---|
| Temperature, °C. (° F.) | | 48.8 (120) | 70 (158) | 28 (82) | 25.5 (78) | 18 (65) |
| Pressure, kPa(g) (psig) | | 1.72 (0.25) | 4157.5 (603) | 6757 (980) | 34.5 (5) | 34.5 (5) |
| Mass Flow, kg/hr (lb/hr) | | 50270 (110827) | 48488 (106898) | 46714 (102987) | 1001.5 (2208) | 654 (1442) |
| Composition, mol % | $H_2O$ | 11.4 | 0.6 | 0 | 0 | — |
| | $O_2$ | 2.1 | 2.9 | 10 ppm | 79.6 | 37.9 |
| | $N_2$ | 0.5 | 0.6 | 0 | 20.2 | 4.0 |

TABLE 2-continued

| Stream | 266 | 285 | 296 | 310" | 312 |
|---|---|---|---|---|---|
| CO | 0 | 0 | 0 | 0 | 0 |
| $CO_2$ | 86.0 | 95.9 | 99.9+ | 0.2 | 58.1 |
| $SO_2$ | <10 ppm | <10 ppm | <10 ppm | 0 | 0 |
| $SO_3$ | <10 ppm | <10 ppm | <10 ppm | 0 | 0 |
| NO | <10 ppm | <20 ppm | 0 | <500 ppm | <100 ppm |
| $NO_2$ | <10 ppm | <10 ppm | <10 ppm | 0 | 0 |

The $CO_2$ separation section 111 with the pressure swing adsorption unit (311) produced a high $CO_2$ purity of about 99+mol %. A high $CO_2$ recovery of about 98+% was observed. An oxygen stream was produced which was greater than 79 mol % oxygen. In this study, the parameters of the $CO_2$ fractionation system were also set by the oxygen level in the $CO_2$ product stream which was found to be about 10 ppm. As evident from the second study, the pressure swing adsorption unit (311) can be utilized to maximize $CO_2$ capture and/or to achieve a specific $O_2$ purity level.

Specific Embodiments

While the following is described in conjunction with specific embodiments, it will be understood that this description is intended to illustrate and not limit the scope of the preceding description and the appended claims.

A first embodiment of the present disclosure is a process for separating a carbon dioxide product stream from a flue gas stream comprising passing a stream of carbon dioxide and oxygen to a regenerator to regenerate a catalyst stream and produce a flue gas stream comprising carbon oxides, sulfur oxides, and/or nitrogen oxides, catalyst fines, oxygen, and water; transferring heat from the flue gas stream to a water stream in a heat recovery unit to form a steam stream; removing at least one of the sulfur oxides, nitrogen oxides, and catalyst fines from the flue gas stream in a decontamination unit; removing water from the flue gas stream in a dehydration unit; and separating the flue gas stream into an oxygen rich stream and a carbon dioxide product stream. An embodiment of the present disclosure is one, any or all of prior embodiments in this paragraph up through the first embodiment in this paragraph further comprising reacting the sulfur oxides with a reactant in the decontamination unit to remove sulfur oxides from the flue gas stream. An embodiment of the present disclosure is one, any or all of prior embodiments in this paragraph up through the first embodiment in this paragraph wherein the flue gas stream is passed to the decontamination unit before the dehydration unit and comprises passing a partially cooled flue gas stream from the heat recovery unit to the decontamination unit; reacting one or more of a sulfur-containing compound, a nitrogen-containing compound, or both in the partially cooled flue gas stream with a reactant in a decontamination reactor to form a reactor effluent flue gas stream and a contaminant stream; and passing the reactor effluent flue gas stream to the dehydration unit. An embodiment of the present disclosure is one, any or all of prior embodiments in this paragraph up through the first embodiment in this paragraph further comprising transferring heat from the reactor effluent flue gas stream to provide a cooled flue gas stream; separating water from the cooled flue gas stream in a knockout drum to provide a partially dehydrated flue gas stream; and removing water from the partially dehydrated flue gas stream in the dehydration unit to provide a dehydrated flue gas stream. An embodiment of the present disclosure is one, any or all of prior embodiments in this paragraph up through the first embodiment in this paragraph further comprising taking a carbon dioxide recycle stream from the partially dehydrated flue gas stream; and passing the carbon dioxide recycle stream to the regenerator. An embodiment of the present disclosure is one, any or all of prior embodiments in this paragraph up through the first embodiment in this paragraph further comprising fractionating the dehydrated flue gas stream in a cryogenic fractionation column to provide the oxygen rich stream and the carbon dioxide product stream. An embodiment of the present disclosure is one, any or all of prior embodiments in this paragraph up through the first embodiment in this paragraph further comprising separating the oxygen rich stream into a first oxygen rich stream and a second oxygen rich stream; compressing the first oxygen rich stream to provide a compressed oxygen rich stream; separating the compressed oxygen rich stream along with the flue gas stream in a cryogenic fractionation column to provide the carbon dioxide product stream; and expanding the second oxygen rich stream to provide a purified oxygen stream. An embodiment of the present disclosure is one, any or all of prior embodiments in this paragraph up through the first embodiment in this paragraph further comprising separating a heavier liquid stream comprising oxides of nitrogen and/or oxides of sulfur in the cryogenic fractionation column; and reacting one or more of a sulfur-containing compound, a nitrogen-containing compound, or both in the heavier liquid stream with a reactant in a decontamination reactor to form a reactor effluent flue gas stream and a contaminant stream, the reactor effluent flue gas stream having a level of the sulfur-containing compound, the nitrogen-containing compound, or both which is less than a level of the sulfur-containing compound, the nitrogen-containing compound, or both in the heavier liquid stream. An embodiment of the present disclosure is one, any or all of prior embodiments in this paragraph up through the first embodiment in this paragraph further comprising passing the oxygen rich stream to a pressure swing absorption (PSA) unit; separating the oxygen rich stream into a purified oxygen stream and a PSA tail gas stream; and recycling the PSA tail gas stream to a cryogenic fractionation column. An embodiment of the present disclosure is one, any or all of prior embodiments in this paragraph up through the first embodiment in this paragraph wherein the regenerator is operating at a full burn condition. An embodiment of the present disclosure is one, any or all of prior embodiments in this paragraph up through the first embodiment in this paragraph wherein removing water from the partially dehydrated flue gas stream comprises passing a first partially dehydrated flue gas stream taken from the partially dehydrated flue gas stream to the dehydration unit to separate water and provide the dehydrated flue gas stream. An embodiment of the present disclosure is one, any or all of prior embodiments in this paragraph up through the first embodiment in this paragraph further comprising compressing a second partially dehydrated flue gas stream taken from the partially dehydrated flue gas stream to provide the carbon dioxide recycle stream; separating the carbon dioxide recycle stream into a first carbon dioxide recycle stream and a second carbon dioxide recycle stream; heating the first carbon dioxide recycle stream to produce a preheated first carbon dioxide recycle stream; combining the preheated first carbon dioxide recycle stream and the second carbon dioxide recycle stream to provide the carbon dioxide recycle stream; and passing the carbon dioxide recycle stream to the regenerator. An embodiment of the present disclosure is one, any or all of prior embodiments in this paragraph up through the first embodiment in this paragraph further comprising combining the carbon dioxide recycle stream with a concentrated oxygen stream taken from an electrolyzer or an air separation unit to provide the stream of carbon dioxide and oxygen. An embodiment of the present disclosure is one, any or all of prior embodiments in this paragraph up through the first embodiment in this paragraph wherein the carbon dioxide product stream comprises about 10% to about 60% of the carbon dioxide recycle stream. An embodiment of the present disclosure is one, any or all of prior embodiments in this paragraph up through the first embodiment in this paragraph wherein reacting one or more of a sulfur-containing compound, a nitrogen-containing compound, or both in the partially cooled flue gas stream with a reactant in the decontamination reactor comprises reacting the partially cooled flue gas stream with a dry reactant in a dry SOx reaction section of the decontamination reactor to form a dry SOx reaction section flue gas stream, wherein the dry reactant comprises at least one of $NaHCO_3$, $NaHCO_3 \cdot Na_2CO_3 \cdot 2(H_2O)$, $CaCO_3$, $Ca(OH)_2$, and $Mg(OH)_2$; and filtering the dry SOx reaction section flue gas stream to remove, $Na_2SO_4$, $CaSO_4$, $MgSO_4$, and catalyst fines to provide the reactor effluent flue gas stream and a filtered material stream. An embodiment of the present disclosure is one, any or all of prior embodiments in this paragraph up through the first embodiment in this paragraph wherein removing nitrogen oxides from the flue gas stream comprises reacting the nitrogen oxides with ozone and producing oxygen in the decontamination unit. An embodiment of the present disclosure is one, any or all of prior embodiments in this paragraph up through the first embodiment in this paragraph wherein reacting one or more of a sulfur-containing compound, a nitrogen-containing compound, or both in the partially cooled flue gas stream with a reactant in the decontamination reactor comprises passing the partially cooled flue gas stream, an alkaline solution, and to the decontamination reactor; and reacting the alkaline solution with the partially cooled flue gas stream in a wet SOx reaction section of the decontamination reactor to form the reactor effluent flue gas stream and a liquid stream comprising at least one of $H_2O$, $CO_2$, $CO$, $N_2$, $O_2$, $Na_2SO_3$, $Na_2SO_4$, $NaHSO_3$, $Na_2CO_3$, $(NH_4)_2SO_4$, and catalyst fines. An embodiment of the present disclosure is one, any or all of prior embodiments in this paragraph up through the first embodiment in this paragraph further comprising passing sad flue gas stream to a carbon monoxide combustor to convert carbon monoxide to carbon dioxide and provide a carbon dioxide rich flue gas stream; and passing the carbon dioxide rich flue gas stream to the heat recovery unit.

A second embodiment of the present disclosure is a process for separating a carbon dioxide product stream from a flue gas stream comprising passing a stream of carbon dioxide and oxygen to a regenerator to regenerate a catalyst stream and produce a flue gas stream comprising carbon oxides, sulfur oxides, and/or nitrogen oxides, catalyst fines, oxygen, and water; transferring heat from the flue gas stream to a water stream in a heat recovery unit to form a steam stream; removing water from the flue gas stream in a separator to provide a partially dehydrated flue gas stream; taking a carbon dioxide recycle stream from the partially dehydrated flue gas stream; and removing water from the partially dehydrated flue gas stream to provide a dehydrated flue gas stream; and separating the dehydrated flue gas stream into an oxygen rich stream and a carbon dioxide product stream.

A third embodiment of the present disclosure is a process for separating a carbon dioxide product stream from a flue gas stream comprising passing a stream of carbon dioxide and oxygen to a regenerator to regenerate a catalyst stream in a full burn mode and produce a flue gas stream comprising carbon oxides, sulfur oxides, and/or nitrogen oxides, catalyst fines, oxygen, and water; transferring heat from the flue gas stream to a water stream in a heat recovery unit to form a steam stream; removing water from the flue gas stream in a dehydration unit; and separating the flue gas stream into an oxygen rich stream and a carbon dioxide product stream.

Without further elaboration, it is believed that using the preceding description that one skilled in the art can utilize the present disclosure to its fullest extent and easily ascertain the essential characteristics of this disclosure, without departing from the spirit and scope thereof, to make various changes and modifications of the disclosure and to adapt it to various usages and conditions. The preceding preferred specific embodiments are, therefore, to be construed as merely illustrative, and not limiting the remainder of the disclosure in any way whatsoever, and that it is intended to cover various modifications and equivalent arrangements included within the scope of the appended claims.

In the foregoing, all temperatures are set forth in degrees Celsius and, all parts and percentages are by weight, unless otherwise indicated.

The invention claimed is:

1. A process for separating a carbon dioxide product stream from a flue gas stream comprising:
    passing a stream of carbon dioxide and oxygen to a regenerator to regenerate a catalyst stream and produce a flue gas stream comprising carbon oxides, sulfur oxides, and/or nitrogen oxides, catalyst fines, oxygen, and water;
    transferring heat from said flue gas stream to a water stream in a heat recovery unit to form a steam stream;
    removing at least one of the sulfur oxides, nitrogen oxides, and catalyst fines from said flue gas stream in a decontamination unit;
    removing water from said flue gas stream in a dehydration unit;
    separating said flue gas stream into an oxygen rich stream and a carbon dioxide product stream in a cryogenic fractionation column;
    separating said oxygen rich stream into a first oxygen rich stream and a second oxygen rich stream;
    compressing said first oxygen rich stream to provide a compressed oxygen rich stream;
    separating said compressed oxygen rich stream along with said flue gas stream in the cryogenic fractionation column to provide said carbon dioxide product stream; and
    expanding said second oxygen rich stream to provide a purified oxygen stream.

2. The process of claim 1 further comprising reacting the sulfur oxides with a reactant in the decontamination unit to remove sulfur oxides from said flue gas stream.

3. The process of claim 1 wherein said flue gas stream is passed to the decontamination unit before the dehydration unit and comprises:
  passing a partially cooled flue gas stream from the heat recovery unit to the decontamination unit;
  reacting one or more of a sulfur-containing compound, a nitrogen-containing compound, or both in said partially cooled flue gas stream with a reactant in a decontamination reactor to form a reactor effluent flue gas stream and a contaminant stream; and
  passing said reactor effluent flue gas stream to the dehydration unit.

4. The process of claim 3 further comprising:
  transferring heat from said reactor effluent flue gas stream to provide a cooled flue gas stream;
  separating water from said cooled flue gas stream in a knockout drum to provide a partially dehydrated flue gas stream; and
  removing water from said partially dehydrated flue gas stream in the dehydration unit to provide a dehydrated flue gas stream.

5. The process of claim 4 further comprising:
  taking a carbon dioxide recycle stream from said partially dehydrated flue gas stream; and
  passing said carbon dioxide recycle stream to the regenerator.

6. The process of claim 4 further comprising:
  fractionating said dehydrated flue gas stream in a cryogenic fractionation column to provide said oxygen rich stream and said carbon dioxide product stream.

7. The process of claim 1 further comprising:
  separating a heavier liquid stream comprising oxides of nitrogen and/or oxides of sulfur in the cryogenic fractionation column; and
  reacting one or more of a sulfur-containing compound, a nitrogen-containing compound, or both in said heavier liquid stream with a reactant in a decontamination reactor to form a reactor effluent flue gas stream and a contaminant stream, said reactor effluent flue gas stream having a level of the sulfur-containing compound, the nitrogen-containing compound, or both which is less than a level of the sulfur-containing compound, the nitrogen-containing compound, or both in said heavier liquid stream.

8. The process of claim 1 wherein said regenerator is operating at a full burn condition.

9. The process of claim 4 wherein removing water from said partially dehydrated flue gas stream comprises:
  passing a first partially dehydrated flue gas stream taken from said partially dehydrated flue gas stream to the dehydration unit to separate water and provide said dehydrated flue gas stream.

10. The process of claim 5 further comprising:
  compressing a second partially dehydrated flue gas stream taken from said partially dehydrated flue gas stream to provide said carbon dioxide recycle stream;
  separating said carbon dioxide recycle stream into a first carbon dioxide recycle stream and a second carbon dioxide recycle stream;
  heating said first carbon dioxide recycle stream to produce a preheated first carbon dioxide recycle stream;
  combining said preheated first carbon dioxide recycle stream and said second carbon dioxide recycle stream to provide said carbon dioxide recycle stream; and
  passing said carbon dioxide recycle stream to the regenerator.

11. The process of claim 10 further comprising combining said carbon dioxide recycle stream with a concentrated oxygen stream taken from an electrolyzer or an air separation unit to provide said stream of carbon dioxide and oxygen.

12. The process of claim 10 wherein said carbon dioxide product stream comprises about 10% to about 70% of said carbon dioxide recycle stream.

13. The process of claim 3 wherein reacting one or more of a sulfur-containing compound, a nitrogen-containing compound, or both in said partially cooled flue gas stream with a reactant in the decontamination reactor comprises:
  reacting said partially cooled flue gas stream with a dry reactant in a dry SOx reaction section of the decontamination reactor to form a dry SOx reaction section flue gas stream, wherein the dry reactant comprises at least one of NaHCO3, NaHCO3·Na2CO3·2 (H2O), CaCO3, Ca(OH)2, and Mg(OH)2; and
  filtering said dry SOx reaction section flue gas stream to remove, Na2SO4, CaSO4, MgSO4, and catalyst fines to provide said reactor effluent flue gas stream and a filtered material stream.

14. The process of claim 1 wherein removing nitrogen oxides from said flue gas stream comprises reacting the nitrogen oxides with ozone and producing oxygen in the decontamination unit.

15. The process of claim 3 wherein reacting one or more of a sulfur-containing compound, a nitrogen-containing compound, or both in said partially cooled flue gas stream with a reactant in the decontamination reactor comprises:
  passing said partially cooled flue gas stream and an alkaline solution to the decontamination reactor; and
  reacting the alkaline solution with said partially cooled flue gas stream in a wet SOx reaction section of the decontamination reactor to form said reactor effluent flue gas stream and a liquid stream comprising at least one of $H_2O$, $CO_2$, $CO$, $N_2$, $O_2$, $Na_2SO_3$, $Na_2SO_4$, $NaHSO_3$, $Na_2CO_3$, $(NH_4)_2SO_4$, and catalyst fines.

16. The process of claim 1 further comprising:
  passing sad flue gas stream to a carbon monoxide combustor to convert carbon monoxide to carbon dioxide and provide a carbon dioxide rich flue gas stream; and
  passing said carbon dioxide rich flue gas stream to the heat recovery unit.

17. A process for separating a carbon dioxide product stream from a flue gas stream comprising:
  passing a stream of carbon dioxide and oxygen to a regenerator to regenerate a catalyst stream and produce a flue gas stream comprising carbon oxides, sulfur oxides, and/or nitrogen oxides, catalyst fines, oxygen, and water;
  transferring heat from said flue gas stream to a water stream in a heat recovery unit to form a steam stream;
  removing at least one of the sulfur oxides, nitrogen oxides, and catalyst fines from said flue gas stream in a decontamination unit to form a reactor effluent flue gas stream;
  transferring heat from said reactor effluent flue gas stream to provide a cooled flue gas stream;
  removing water from said cooled flue gas stream in a separator to provide a partially dehydrated flue gas stream;
  taking a carbon dioxide recycle stream from said partially dehydrated flue gas stream; and
  removing water from said partially dehydrated flue gas stream to provide a dehydrated flue gas stream; and separating said dehydrated flue gas stream into an oxygen rich stream and a carbon dioxide product stream.

18. A process for separating a carbon dioxide product stream from a flue gas stream comprising:

passing a stream of carbon dioxide and oxygen to a regenerator to regenerate a catalyst stream and produce a flue gas stream comprising carbon oxides, sulfur oxides, and/or nitrogen oxides, catalyst fines, oxygen, and water;

transferring heat from said flue gas stream to a water stream in a heat recovery unit to form a steam stream;

removing at least one of the sulfur oxides, nitrogen oxides, and catalyst fines from said flue gas stream in a decontamination unit;

removing water from said flue gas stream in a dehydration unit;

separating said flue gas stream into an oxygen rich stream and a carbon dioxide product stream in a cryogenic fractionation column;

passing said oxygen rich stream to a pressure swing absorption (PSA) unit;

separating said oxygen rich stream into a purified oxygen stream and a PSA tail gas stream; and recycling said PSA tail gas stream to the cryogenic fractionation column.

* * * * *